US006347796B1

(12) United States Patent
Grossman et al.

(10) Patent No.: US 6,347,796 B1
(45) Date of Patent: Feb. 19, 2002

(54) HAND HELD VIDEO GAME CASE WITH UNIVERSAL POWER PACK

(75) Inventors: Eric Grossman, Deer Park; Leifer Alan, Dix Hills; Gabe Neiser, Hauppauge, all of NY (US)

(73) Assignee: Arista Enterprises Inc., Hauppauge, NY (US)

( * ) Notice: Subject to any disclaimer, the term of this patent is extended or adjusted under 35 U.S.C. 154(b) by 0 days.

(21) Appl. No.: 09/513,542

(22) Filed: Feb. 25, 2000

(51) Int. Cl.⁷ .............................................. A63B 71/00
(52) U.S. Cl. ........................ 273/148 B; 463/46; 463/1; 206/320; 206/315.1
(58) Field of Search ................... 463/46, 1; 273/148 B; 206/315.1, 579, 320, 701, 778

(56) References Cited

U.S. PATENT DOCUMENTS

| | | | | | |
|---|---|---|---|---|---|
| 4,658,956 A | * | 4/1987 | Takeda et al. | .............. | 206/320 |
| 5,046,739 A | * | 9/1991 | Reichow | ................. | 273/148 B |
| 5,325,278 A | * | 6/1994 | Tortola et al. | ........... | 273/148 B |
| 5,325,280 A | * | 6/1994 | Tortola et al. | ........... | 273/148 B |
| 5,388,692 A | * | 2/1995 | Withrow et al. | ............. | 206/320 |
| 5,768,371 A | * | 6/1998 | Snyder | ........................ | 379/446 |
| 5,887,723 A | * | 3/1999 | Myles et al. | ................. | 206/760 |
| D434,811 S | * | 12/2000 | Aleman | ..................... | D21/333 |
| 6,206,187 B1 | * | 3/2001 | VanWinkle | ................. | 206/320 |
| 6,250,765 B1 | * | 6/2001 | Murakami | .................. | 359/609 |

\* cited by examiner

Primary Examiner—Jessica J. Harrison
(74) Attorney, Agent, or Firm—Keusey, Tutunjian & Bitetto

(57) ABSTRACT

A case and universal power pack for a hand held video game device includes a power pack with integrated plug engaging the external power supply jack on the hand held game device, and thereby provides power to the game device. A cover flap may be selectively adjusted by the user to provide optimum playing conditions and includes a glare reducing surface to further aid in providing the optimum playing environment. The case includes grip strips on opposing sides thereof, and includes access points for accessing the various external controls and jacks of the game device. The power pack is accessible from inside the case when the game device is removed therefrom.

19 Claims, 5 Drawing Sheets

HAND HELD VIDEO GAME CASE WITH
UNIVERSAL POWER PACK

BACKGROUND OF THE INVENTION

1. Field of the Invention

The present invention relates to hand held video game devices, and more particularly, it relates to a case with universal power pack for Nintendo GAMEBOY®, GAMEBOY COLOR® and GAMEBOY POCKET® type hand held video game devices.

2. Description of the Related Art

There are many types of hand held video game devices currently in use today. An example of one of these devices is shown in U.S. Pat. No. 5,184,830. As shown in the '830 patent, the hand held video game device generally has a display screen with several different buttons and controls for actuation by the user in response to the activity shown on the display screen. These devices are generally made of a molded plastic material that has appropriate ridges, contours and cutouts to accommodate various features of the device such as, for example, a head/ear phone jack, volume control, external power jack, speakers, etc.

As these hand held video game devices are generally games for use by children, they tend to be subject to physical abuse by being carried around in pockets and thrown into and out of bags. This physical abuse can result in a shortened life of the hand held device and can also damage or impair the display screen on which the game is viewed.

Another aspect of hand held video game devices is their limited play time resulting from battery power supply removably disposed within the device. Most hand held video devices include an external power jack for connection to an external power supply that is generally an AC power converted which transforms the AC current from an AC wall outlet into the DC current required to operate the device. The AC connection to the device requires the user to remain in proximity to the AC outlet to which it is plugged in. As such, these AC/DC converters for providing external power to the hand held video game device limit the portability of such devices and thereby defeats the purpose of the portable hand held video game device.

SUMMARY OF THE INVENTION

It is therefore an object of the present invention to provide a case for hand held video game devices that protects the device from wear and tear during use and transport of the device.

It is another object of the present invention to provide a case for hand held video game devices that includes an external power pack that can be used to extend the play life of the device or can be used in place of the batteries contained within the device.

This and other objects are achieved in accordance with an embodiment of the present invention where the case includes a game device receiving compartment having a front panel, a back panel, a top panel, a bottom panel, two opposing side panels and a cutout the front panel that allows access to control buttons on the game device and enables viewing of a display screen of the game device during play. A cover is pivotally connected at one end to the top of the receiving portion and is adapted to selectively cover the display screen and control buttons of the game device closed.

In another embodiment, the case includes a power pack that contains a battery pack that may be rechargeable. A power plug is positioned within the case and adapted to mate with a corresponding external power jack on the game device when inserted into the case. The power pack provides additional power to the game device which may be used to extend game play or power other accessory items designed for use with the game device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings wherein like reference numerals denoted like elements throughout the several views.

DETAILED DESCRIPTION OF THE PRESENTLY PREFERRED EMBODIMENTS

Figure 1:
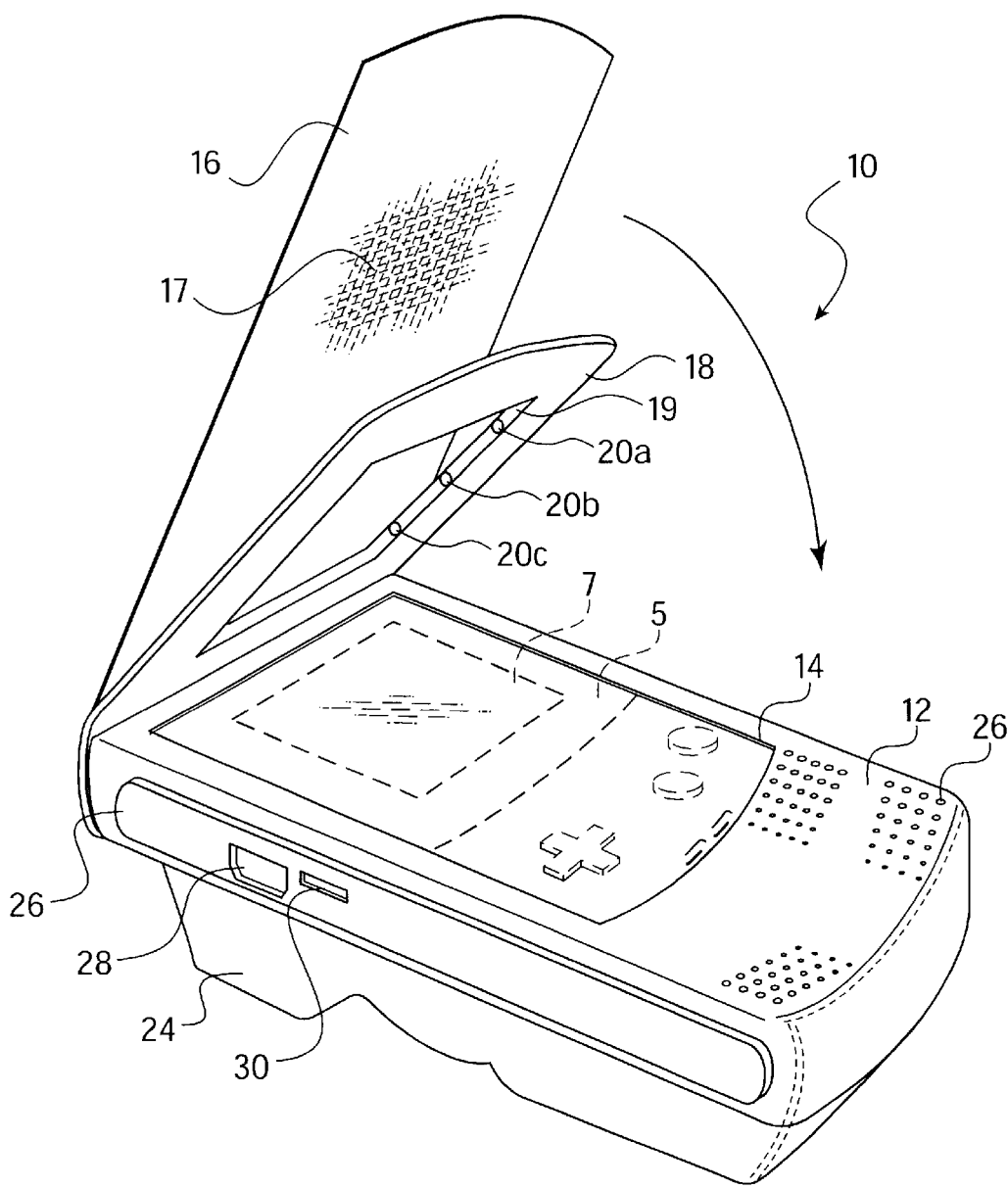
FIG. 1 is a front perspective view of the hand held video game case in accordance with an embodiment of the present invention.

FIG. 1a shows a first embodiment of the combined case/power pack 10 according to the present invention in which is mounted a hand held video game. The hand held video game device 5 is inserted into the case 12 which includes a cutout 14, an outer flap 16 and an inner flap 18. Cutout 14 is large enough to enable complete access to all buttons and controls on the game device 5, in addition to allowing clear viewing of display screen 7. Case 12 also includes holes or openings 26 that correspond to speaker locations on the game device 5, grip strips 22 on each side thereof and a power pack 24 for providing power to the game device 5. Grip strips 22 are disposed along each longitudinal edge of the case and can potentially extend around the bottom and top sides of the case. Grip strips may also be ribbed or textured to further provide a non-slip area which the user may use to hold or grip the game. Strips 22 can be made our of any suitable known material, such as, for example rubber, vinyl, poly-resins, and any suitable form of plastics. In addition, strips 22 may provide additional protection to game device 5 from physical abuse such as accidental dropping or hitting into other objects. As shown, case 5 and strip 22 has cutouts 28 and 30 for enabling access to correspondingly disposed jacks on game device 5 to be connected to other external devices. Examples of these jacks can be a headphone jack, a connection jack for connecting the device to other hand held devices for head to head play, an external power jack, a volume control dial, etc.

When outer flap 16 is closed, or pivoted down toward game device 5, cutout 14 is completely covered enabling the game device 5 to be safely stored and protected from the environment. In accordance with one embodiment, outer flap 16 includes a surface texture 17 (partially shown) that does not reflect light and thereby is adapted to reduce glare on the liquid crystal display (LCD) display screen 7 of the game device 5. Inner flap 18 has a cutout opening 19 that corresponds in size to the size of the display screen 7 of the game device 5. The underside of inner flap 18 (i.e., side facing game device 5) may also include a surface texture 17 as described with respect to outer flap 16. In one embodiment, cutout 19 includes a light source 20a–20c operably positioned in a side wall of cutout 19. When inner flap 18 is pivoted downward so as to be resting over screen 7, light sources 20a–20c illuminate screen 7 to enhance game play in low light conditions. Light sources 20a–20c are shown, by way of example, in one side of cutout 19, however it is to be understood that they are placed around any one or more of the tour sides to cutout 19. Light sources 20a–20c can be, for example, light emitting diodes (LEDs) or any other suitable known light source that will illuminate an LCD screen and not cause or contribute to screen glare. In another embodiment, inner flap 18 does not include any light sources.

Figure 2:
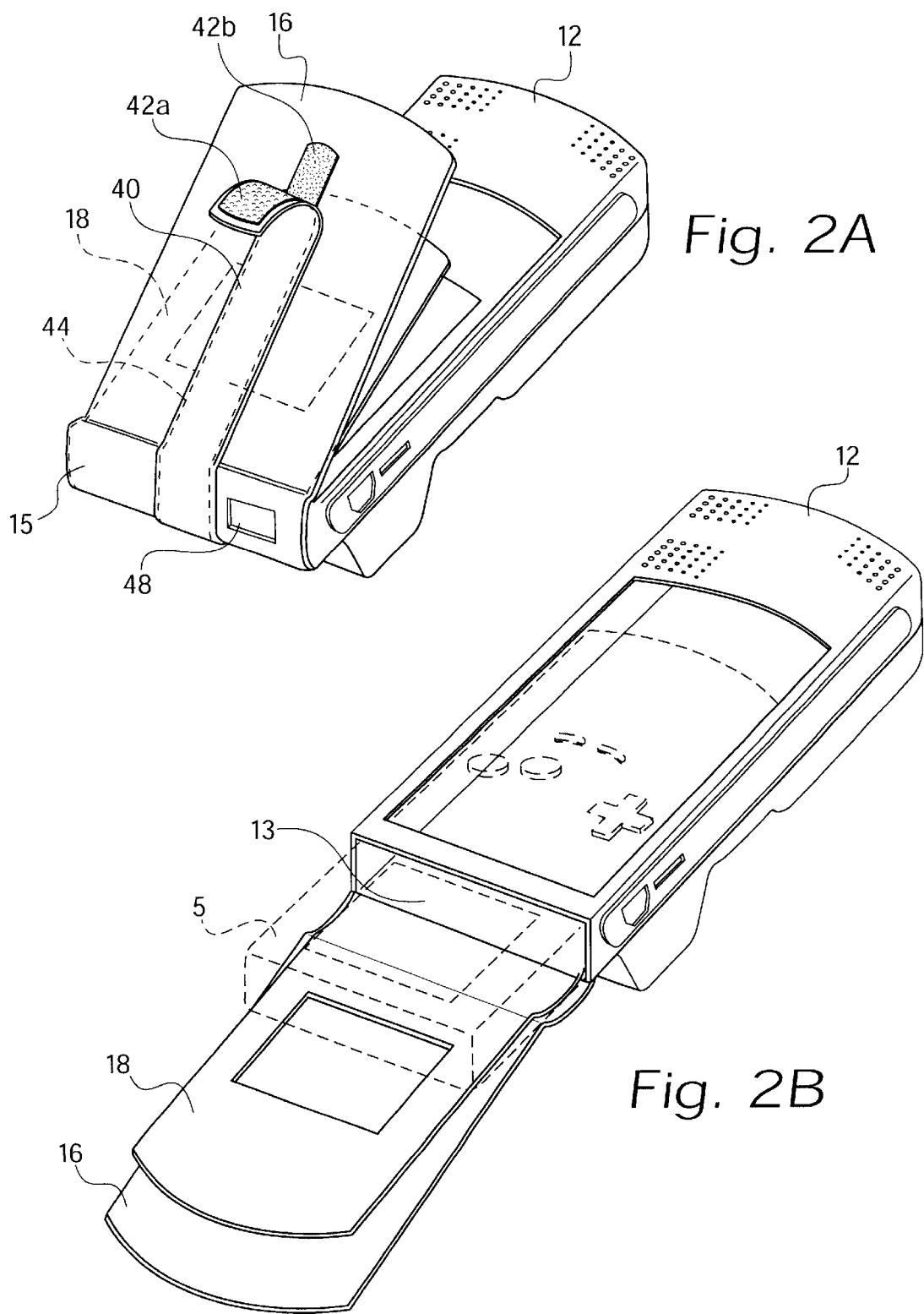
FIG. 2a is a rear perspective view of the hand held video game case in a partially closed position according to an embodiment of the invention.
FIG. 2b is a front perspective of the hand held video game case in an open position for receiving the hand held video game.

FIG. 2a shows the backside of outer flap 16 and the mechanism by which its position is controlled. An adjustment strap 40 extends across a top edge 15 of case 12 and along the exterior of outer flap 16 as shown. Strap 40 adjusts the position of outer flap 16 to maximize and optimize the shading/glare reducing function of the outer flap for the user during play. The underside of strap 40 includes one of the hooks or loops 42a of a hook and loop type fastener such as VELCRO® and the other of the hooks or loops 42b of the hook and loop type fastener are disposed on the outer surface of cover 16 such that they engage strap 40 when disposed in a desired position. In this manner, strap 40 is lifted, and the user may position outer flap 16 with respect to the game device 5 in a desired position. Once the desired position of outer flap 16 is obtained, strap 40 is pressed onto the corresponding hook or loops disposed on over 16 to secure the same. In this embodiment, adjustment strap 40 is affixed to the exterior side of outer flap 16. In another embodiment, adjustment strap 40 may be slidably disposed along the exterior surface of outer flap 16. Strap 40 may also include an internal rigid member 44 for additional support in maintaining outer flap 16 in a desired open position.

FIG. 2b shows case 12 in a game loading position where flaps 16 and 18 are opened to expose an open top 13 that receives game device 5 for insertion into and removal from case 12. The release of strap 46 from its engagement with adjustable strap 40 enables flap 16 and flap 18 (when included) to be positioned as shown in FIG. 2b and to provide opening 13 through which the game device 5 is inserted.

Figure 3:
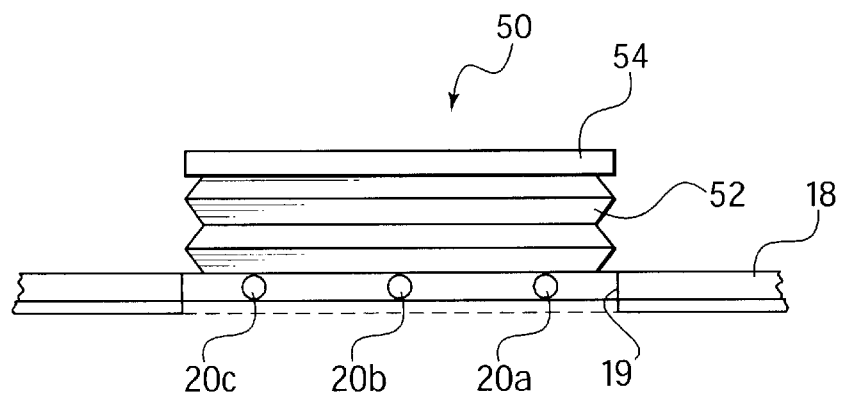
FIG. 3 is a side view of a screen adapter for use in conjunction with the hand held video game case according to another embodiment of the present invention.
Figure 4:
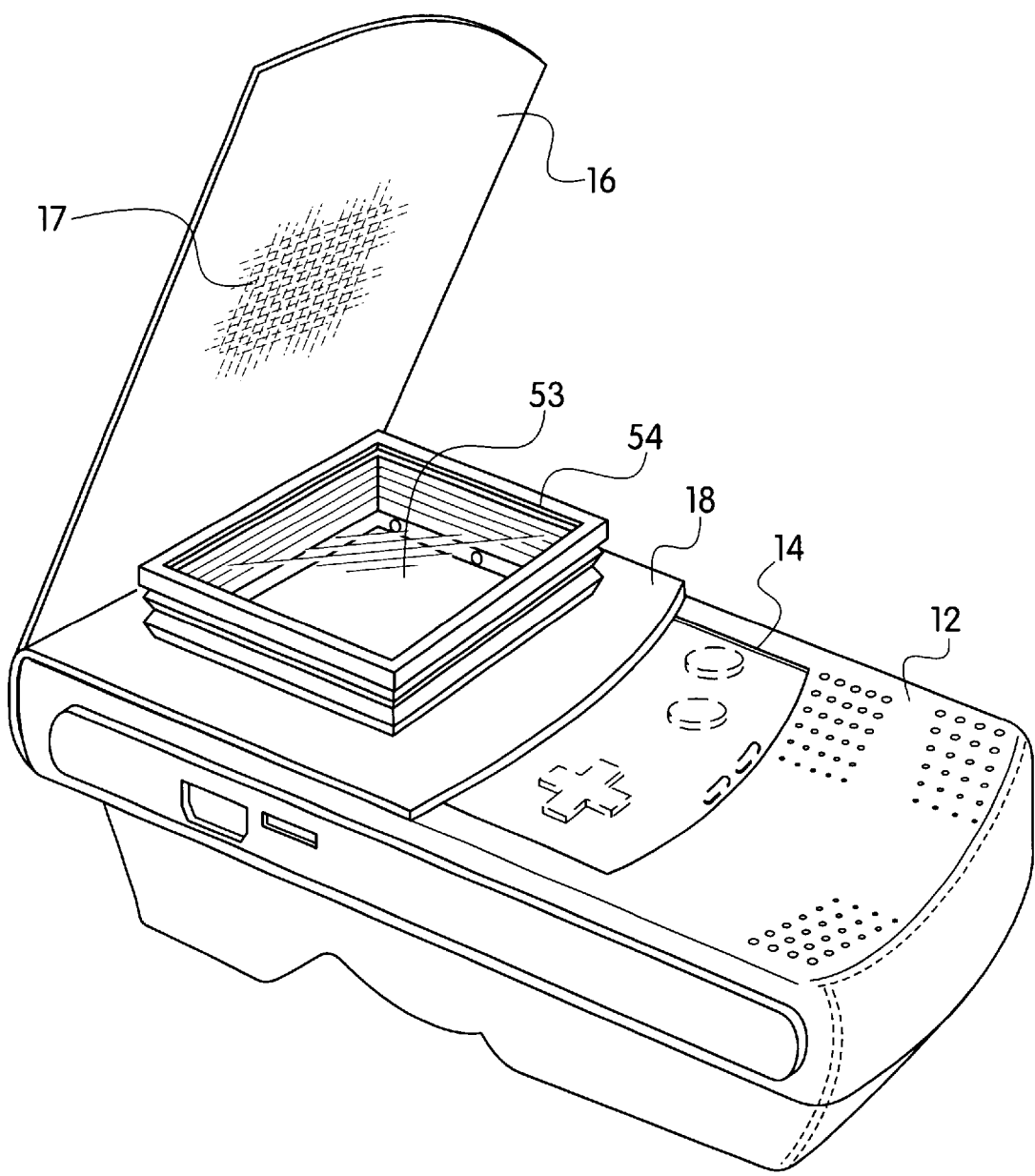
FIG. 4 is a perspective view of the hand held video game case with the screen adapter shown in FIG. 3 mounted thereon.

FIGS. 3 and 4 show a magnifier 50 for use with case 12 in accordance with another embodiment. Magnifier 50 has an upper frame 54, a magnifying glass 53, and a collapsible baffle 52 connecting frame 54 with the inner flap 18. Baffle 52 may be made of a resilient plastic, poly resins, a rubber or any other suitable material and is capable of compressing to a substantially flat configuration when outer flap 16 is closed over inner flap 18. Baffle 52 is also capable of maintaining a variably extended position with respect to the display screen of the game device 5. As such, the user may adjust the distance between magnifying glass 53 and the display screen in order to provide the user with desired magnification and focusing ability. As shown in FIG. 3, magnifier 50 is situated in cutout 19 of inner flap 18 so that light sources 20a–20c (when used) are not obstructed and may be used as desired.

Figure 5:
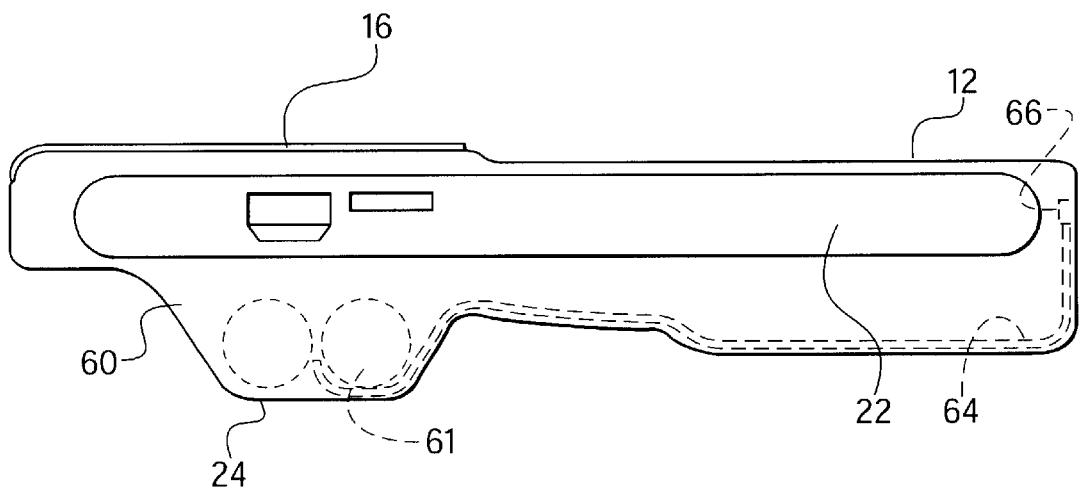
FIG. 5 is a side view of the hand held video game case according to an embodiment of the present invention.
Figure 6:
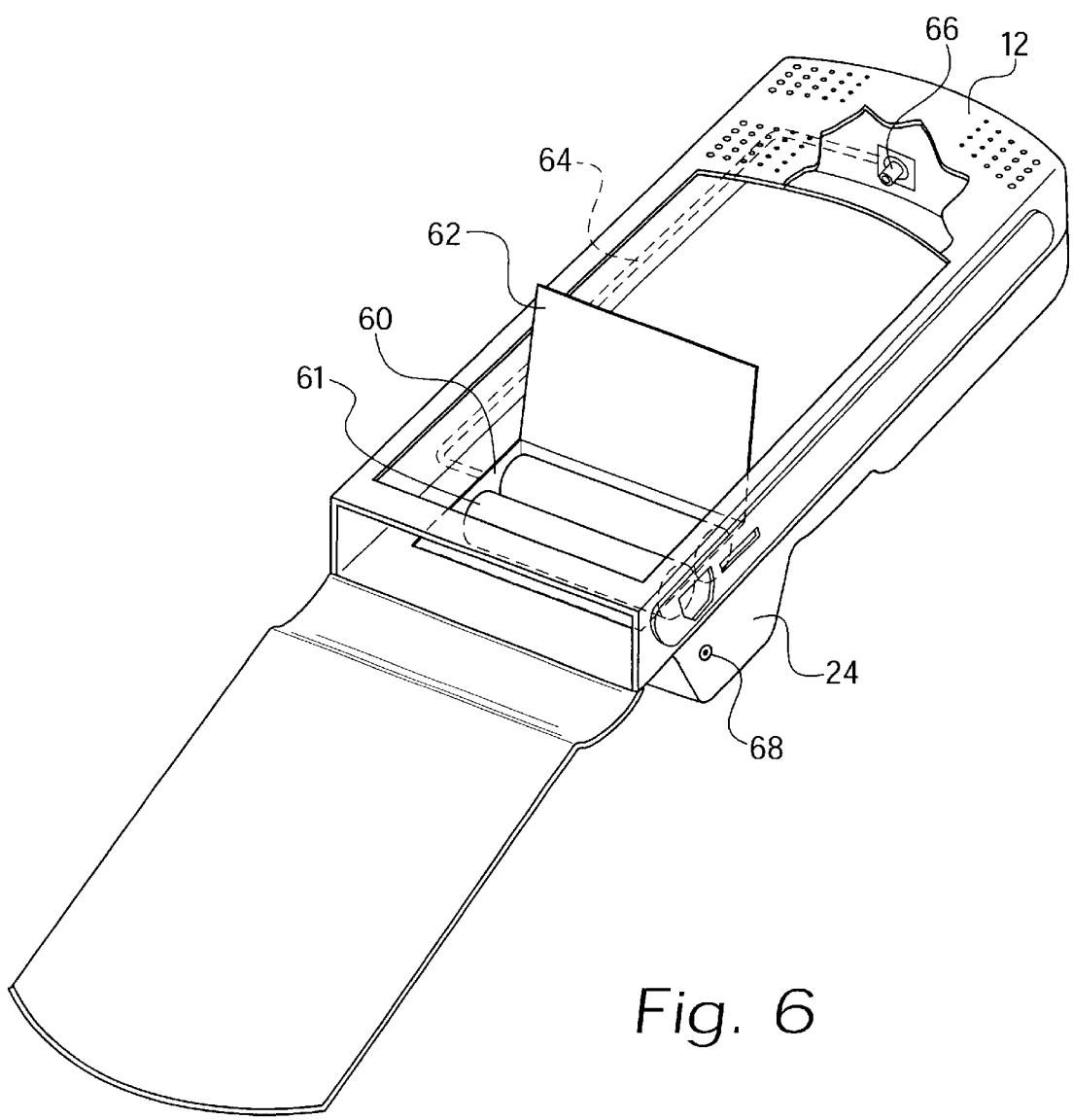
FIG. 6 is a perspective view of the power pack configuration according to another embodiment of the present invention.

FIGS. 5 and 6 show case 12 with battery pack 24 having a battery compartment 60 disposed therein. Battery compartment 60 encloses a removable battery pack 61 accessible through access panel 62 from the interior of case 12. Alternatively, the battery compartment 60 may be accessible from the exterior of case 12 so that the battery pack 61 may be removed without removing the game device 5 from the case 12. Battery pack 61 provides power to the game device 5 via a plug 66 disposed within case 12 and may also provide power to the light sources 20a–20c when used. It is preferred that battery pack 61 have a battery life longer than that provided by the internal battery power of the game device 5. A plug 66 is disposed on the interior of the bottom edge of case 12, so that when game device 5 is inserted into the case, a corresponding external power receptacle on game device 5 will receive plug 66 and thereby provide power to the device from battery pack 61. The position of plug 66 within case 12 may be changed to correspond with the location of the external power receptacle on the game device 5 without departing from the spirit of the present invention. Plug 66 is connected to power pack 24 through an electrical wire connection 64. The specific configuration of wire connection 24 is one of design choice and may be implemented using any suitable known electrical connection, for example, by using wire conductors. Other methods for implementing wire connection 64 may also be used without departing from the spirit of the present invention.

Battery pack 61 may be any known rechargeable or disposable battery power source. When game device 5 is disposed within case 12 and battery pack 61 is rechargeable, it may be recharged by any suitable known methods. One method according to the present invention is to include an external power receptacle 68 on the power pack for receiving a charging current from an external power source. The external power receptacle 68 (i.e., on the outer shell of case 12) would enable the charging of battery pack 62 without requiring its removal from case 12. A separate charging device for battery pack 61 (i.e., external to game device 5) may also be used. It is also to be understood that the configuration of battery pack 61 and corresponding battery compartment 60 is also a matter of design choice and may be implemented in many other ways and shapes so long as battery pack 61 is adapted to fit within the corresponding battery compartment 60.

While there has been shown, described and pointed out fundamental novel features of the invention as applied to preferred embodiments thereof, it will be understood that various omissions, substitutions and changes in the form and details, of the devices illustrated and their operation, may be made by those skilled in the art without departing from the spirit of the invention. For example, it is expressly intended that all combinations of those elements and/or method steps which perform substantially the same function in substantially the same way to achieve the same results are within the scope of the invention. It is also to be understood that the drawings are not necessarily drawn to scale but that they are merely conceptual in nature. It is the intention, therefore, to be limited only as indicated by the scope of the claims appended hereto.

We claim:

1. A case for a hand held video game device comprising:
   a game device receiving compartment having a front, a back, a top, a bottom, two opposing sides and at least one cutout in said front being adapted to allow access to control mechanisms on the game device and to enable viewing of a display screen of the game device during play;
   a cover connected at one end to the top of the receiving compartment and adapted to selectively cover the display screen and control buttons of the game device when the game device is mounted in the game device receiving compartment; and
   adjustment means for selectively adjusting and retaining the position of the cover with respect to the display screen of the game device.

2. The case in accordance with claim 1, further comprising grip strips mounted on each of said opposing sides of said game receiving portion.

3. The case in accordance with claim 1, wherein said cover further comprises glare reducing means adapted to reduce glare on the display screen of the game device.

4. The case in accordance with claim 1, further comprising an internal flap hingedly connected at one end to the top of the receiving portion and having an opening therein corresponding in size to a size of the display screen, said internal flap being positioned over the display screen without obstructing the control buttons of the game device and having illumination means disposed within said opening for illuminating the display screen to aid in viewing of the display screen in low light surrounding conditions.

5. The case in accordance with claim 1, further comprising a power pack integrated within said case and an electrical connection from said power pack to the game device.

6. The case in accordance with claim 5, wherein said electrical connection comprises a plug electrically connected to said power pack and disposed within said case so as to engage a correspondingly positioned external power jack on the game device when the game device is operably disposed within the game receiving compartment of the case.

7. The case in accordance with claim 3, wherein said glare reducing means comprises a surface texture on an underside of the cover facing the game device.

8. The case in accordance with claim 1, wherein said adjustment means comprises:
   a strap releasably connected to an outer surface of said cover and extending across an outer surface of said top of the game receiving compartment; and
   fastening means disposed on said strap and said cover.

9. The case in accordance with claim 8, wherein said fastening means comprises a hook and loop fastener and wherein one of said hooks and loops is disposed on said strap and the other of said hooks and loops is disposed on said cover.

10. The case in accordance with claim 5, wherein said battery pack comprises a rechargeable battery.

11. A case for hand held video game devices comprising:
    a game device receiving compartment having a front, a back, a top, a bottom, two opposing sides and at least one cutout in said front being adapted to allow access to control buttons on the game device and to enable viewing of a display screen of the game device during play;
    a cover connected at one end to the top of the receiving portion and adapted to cover the display screen and control buttons of the game device when in a closed position; and
    power supply means integrated into the case for providing power to the game device and having connection means integrated into the receiving compartment for connecting said power supply means to the game device when the game device is disposed in the receiving compartment.

12. The case in accordance with claim 11, further comprising adjustment means for selectively adjusting and retaining the position of the cover with respect to the display screen of the game device.

13. The case in accordance with claim 12, wherein said power supply means comprises a battery compartment integrated into the game receiving compartment and having an access panel accessible from the game receiving compartment when the game device is not disposed therein.

14. The case in accordance with claim 11, wherein said connection means comprises a plug electrically connected to said power supply means and disposed within said case so as to engage a correspondingly positioned external power jack on the game device when the game device is operably disposed within the receiving compartment of the case.

15. The case in accordance with claim 11, wherein said power supply means further comprises an external jack for receiving an external power source.

16. The case in accordance with claim 15, wherein said external power source provides power to the game device via said external jack and said power supply means.

17. The case in accordance with claim 15, wherein said external power source enables recharging of the power supply means through said external jack.

18. The case in accordance with claim 11, wherein said power supply means comprises at least one rechargeable battery.

19. The case in accordance with claim 11, wherein said power supply means comprises a rechargeable battery pack.

* * * * *